United States Patent Office 3,597,454
Patented Aug. 3, 1971

3,597,454
PROCESS OF CYCLIZING NAPHTHALENE DERIVATIVES
Edward George Brain, Leigh, near Reigate, and John Christopher Hanson, Newdigate, England, assignors to Beecham Group Limited, Brentford, Middlesex, England
No Drawing. Filed July 15, 1968, Ser. No. 744,697
Claims priority, application Great Britain, July 15, 1967, 32,654/67
Int. Cl. C07c *167/02*
U.S. Cl. 260—397.45  5 Claims

ABSTRACT OF THE DISCLOSURE

A cyclopentanophenanthrene derivative of the formula:

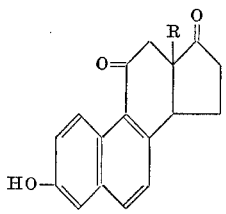

wherein R is methyl, are produced by cyclizing a naphthalene derivative of the formula:

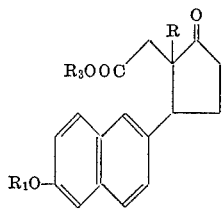

wherein R is methyl and $R_1$ and $R_3$ are hydrogen or lower alkyl, with pyridine hydrochloride. This process produces greatly increased yields and minimizes the production of by-products. The cyclopentaophenanthrene derivative is obtained in a substantially pure state.

---

This invention relates to an improved process of cyclising certain 2-cyclopentylnaphthalene derivatives to cyclopentanophenanthrene derivatives.

It is known that some 2-cyclopentylnaphthalene derivatives can be cyclised to give cyclopentanophenanthrene derivatives by using such cyclising agents as polyphosphoric acid or similar reagents. In such procedures yields are poor and by-products are formed that are difficult to separate from the desired products.

It is an object of the present invention to utilise a cyclising reagent that gives a far smoother reaction, with much higher yields of purer product.

Accordingly the present invention provides a process for the preparation of cyclopentanophenanthrene derivatives of the formula:

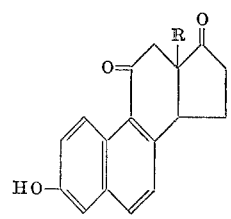

wherein R is a lower alkyl, which process comprises heating a naphthalene derivative of the formula:

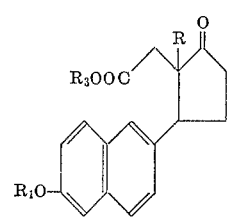

wherein R is as defined above and $R_1$ and $R_3$ are each a hydrogen atom or a lower alkyl group, with pyridine hydrochloride.

As used herein, the term lower alkyl denotes a group containing 1 to 5 carbon atoms and lower alkenyl a group containing 2 to 5 carbon atoms.

Prolonged heating is usually necessary to effect cyclisation, especially when $R_1$ is an alkyl group, since with such compounds the cyclising agent initially dealkylates to give the corresponding phenolic OH group. Preferably the heating is carried out for about 3 to 6 hours.

Usually the compound of Formula II is heated with the pyridine hydrochloride at 150–250° C. in an inert atmosphere, and the resulting product of Formula I is recovered by extraction and other procedures.

The products have pharmacological properties and are useful intermediates.

The starting compounds of Formula II are described and claimed in our copending application Ser. No. 639,023.

The following example illustrates the invention:

EXAMPLE 1

*dl*-11-ketoisoequilenin 3-(6'-methoxy-2'-naphthyl) - 2 - methylcyclopentanone-2-acetic acid (2.02 g.) was heated with freshly distilled pyridine hydrochloride (10 g.) at 210° for 4 hours in an atmosphere of nitrogen. The dark liquid was cooled and dissolved by shaking with ethyl acetate and water. The ethyl acetate layer was washed with aqueous sodium bicarbonate then with water, and was then extracted twice with 10% aqueous sodium hydroxide. The sodium hydroxide extracts were acidified with hydrochloric acid and extracted three times with ethyl acetate.

The ethyl acetate layers were washed with a little water, dried (MgSO₄) and evaporated to give a solid (1.1 g., 58%) which after two recrystallisations from ethanol yielded (±) 11-ketoisoequilenin (0.63 g.) M.P. 219–220°. (Found: C, 77.13; H, 5.76; $C_{18}H_{16}O_3$ requires: C, 77.15; H, 4.75%). $\tau_{max}$ 219, 248.5, 320, 360 m$\mu$ ($\epsilon$ 42,400, 25,400, 5,700, 3,200). Infrared bands (in CHCl₃) at 3584 cm.$^{-1}$ (phenolic OH), 1740 cm.$^{-1}$ (17-keto) and 1670 (11-keto). NMR showed singlet at 8.81$\tau$ (angular methyl), doublet at 0.8$\tau$, J=10 cps. (proton at position 1). The rest of the spectrum is in agreement with the structure given. From the sodium bicarbonate wash was obtained at 25% yield of the uncyclised 3-(6'-hydroxy-2'-naphthyl)-2-methylcyclopentanone-2-acetic acid which can be recycled in the process.

We claim:

1. A process for the preparation of a cyclopentanophenanthrene derivative of the formula:

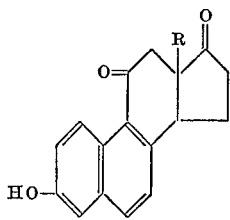

(I)

wherein R is methyl, which comprises heating a naphthalene derivative of the formula:

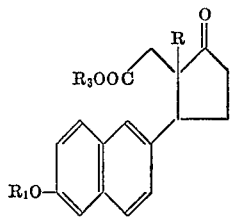

(II)

wherein R is as defined above and $R_1$ and $R_3$ are each hydrogen or lower alkyl, with pyridine hydrochloride.

2. A process as claimed in claim 1, wherein the heating is carried out for 3 to 6 hours.

3. A process as claimed in claim 1 wherein the heating is carried out at 150–250° C.

4. A process as claimed in claim 1, wherein the reactants are heated in an inert atmosphere.

5. A process for the production of 11-ketoisoequilenin which comprises heating 3-(6'-methoxy-2'-naphthyl)-2-methylcyclopentanone-2-acetic acid or a lower alkyl ester of such acid with pyridine hydrochloride as cyclizing agent.

References Cited

UNITED STATES PATENTS 3,202,686  8/1965  Hughes et al. _____ 260—397.45

OTHER REFERENCES

McNiven: J.A.C.S., 76, pp. 1725–1728 (1954).

HENRY A. FRENCH, Primary Examiner

U.S. Cl. X.R.

260—999